United States Patent

Haggerty et al.

[11] Patent Number: 5,868,065
[45] Date of Patent: Feb. 9, 1999

[54] APPARATUS FOR MANUFACTURING FROZEN CONFECTION

[75] Inventors: Matthew K. Haggerty, Milton; Paul R. Kateman, Newton; Clifford S. Lansil, Woburn; Kevin Otto, Watertown; Christopher T. Zirps, Milton, all of Mass.

[73] Assignee: Kateman Family Limited Partnership, Newton, Mass.

[21] Appl. No.: 714,387

[22] Filed: Sep. 16, 1996

[51] Int. Cl.⁶ .............................. A23G 9/00; A23G 9/12; A23G 9/16; A23G 9/20
[52] U.S. Cl. .......................... 99/455; 62/63; 62/342; 99/517; 366/144; 366/149; 366/318
[58] Field of Search ................. 99/348, 516, 517, 99/484, 485, 452–455; 366/144–146, 149, 318; 261/35, 76, 140.1, 78.2, DIG. 7, 16, 75; 62/342, 343, 135–137, 62, 63; 165/122, 140, 61–64; 426/231, 474, 519, 524; 222/335, 342

[56] References Cited

U.S. PATENT DOCUMENTS

| | | |
|---|---|---|
| 1,733,740 | 10/1929 | Vogt . |
| 2,268,905 | 1/1942 | Schaub et al. ............... 62/114 |
| 2,415,585 | 2/1947 | Genova ....................... 62/114 |
| 2,479,261 | 8/1949 | Reetz ........................ 18/48.8 |
| 2,594,442 | 4/1952 | Irwin ........................... 62/2 |
| 2,713,253 | 7/1955 | Chandler ..................... 62/114 |
| 3,188,825 | 6/1965 | Van ........................... 62/123 |
| 3,222,035 | 12/1965 | Lutz et al. .................. 62/342 |
| 3,279,205 | 10/1966 | Stoelting .................... 62/342 |
| 3,298,190 | 1/1967 | Harker ....................... 62/342 |
| 3,304,737 | 2/1967 | Strutynski ................... 62/342 |
| 3,317,198 | 5/1967 | Phelan et al. ................ 62/342 |
| 3,402,562 | 9/1968 | Menzel ....................... 62/342 |
| 3,460,717 | 8/1969 | Thomas ...................... 222/129.1 |
| 3,470,706 | 10/1969 | Mitchell et al. .............. 62/179 |
| 3,726,102 | 4/1973 | Parks .......................... 62/70 |
| 3,780,536 | 12/1973 | Fishman et al. .............. 62/342 |
| 3,803,870 | 4/1974 | Conz .......................... 62/342 |
| 3,817,496 | 6/1974 | Kratochvil et al. ............. 259/6 |
| 3,883,122 | 5/1975 | Werner ...................... 259/192 |
| 3,934,427 | 1/1976 | Keyes ........................ 62/342 |
| 3,954,126 | 5/1976 | Piana ......................... 141/148 |
| 4,034,967 | 7/1977 | Gustairs ....................... 259/6 |
| 4,052,180 | 10/1977 | Erickson ..................... 62/188 |
| 4,201,558 | 5/1980 | Schwitters et al. .......... 62/306 X |
| 4,221,117 | 9/1980 | Martineau ................... 62/306 |
| 4,234,259 | 11/1980 | Wiedmann et al. .......... 366/81 |
| 4,364,666 | 12/1982 | Keyes ........................ 366/142 |
| 4,412,428 | 11/1983 | Giannella et al. ............. 62/308 |
| 4,512,160 | 4/1985 | Arias Mas ..................... 62/71 |
| 4,522,041 | 6/1985 | Menzel ..................... 165/122 X |
| 4,580,905 | 4/1986 | Schwitters et al. ............ 366/149 |
| 4,635,825 | 1/1987 | Tulasne ....................... 222/129 |

(List continued on next page.)

FOREIGN PATENT DOCUMENTS

| | | |
|---|---|---|
| 2163284 | 5/1996 | Canada . |
| 0 503 254 A1 | 9/1992 | European Pat. Off. . |
| 39 18 268 | 7/1990 | Germany . |
| 39 05 946 | 8/1990 | Germany . |
| 1 362 840 | 8/1974 | United Kingdom . |
| 1 491 162 | 11/1977 | United Kingdom . |

*Primary Examiner*—Timothy F. Simone
*Attorney, Agent, or Firm*—Cesari and McKenna, LLP

[57] ABSTRACT

An aerated mixture of unflavored ice cream, yogurt or other food base mix is applied to one end of the interior of an elongated freezing chamber and is advanced along the chamber by a rotating screw or auger. As the mix is advanced within the chamber, it is cooled and worked to form a semi-solid product. Prior to discharge from the remote end of the chamber, flavor is injected and mixed into the product. The free volume in the system from chamber inlet to the discharge point is carefully limited to a minimum amount so that most of the product is cleared from the system during each individual serving. The result is the availability of individual servings of a fresh, high-quality frozen food product.

3 Claims, 1 Drawing Sheet

U.S. PATENT DOCUMENTS

| | | | |
|---|---|---|---|
| 4,680,944 | 7/1987 | Menzel | 62/342 |
| 4,733,607 | 3/1988 | Star et al. | 99/348 |
| 4,736,600 | 4/1988 | Brown | 62/342 |
| 4,878,760 | 11/1989 | Newton et al. | 366/149 |
| 4,910,973 | 3/1990 | Osrow et al. | 62/342 |
| 4,956,980 | 9/1990 | Carvel | 62/342 |
| 4,680,944 | 7/1987 | Menzel | 62/342 |
| 4,733,607 | 3/1988 | Star et al. | 99/348 |
| 4,736,600 | 4/1988 | Brown | 62/342 |
| 4,878,760 | 11/1989 | Newton et al. | 366/149 |
| 4,910,973 | 3/1990 | Osrow et al. | 62/342 |
| 4,956,980 | 9/1990 | Carvel | 62/342 |
| 5,024,066 | 6/1991 | Goavec | 62/306 |
| 5,030,465 | 7/1991 | Curry et al. | 426/474 |
| 5,036,673 | 8/1991 | Miller et al. | 62/63 |
| 5,048,971 | 9/1991 | Wall et al. | 366/85 |
| 5,149,551 | 9/1992 | Anderson | 426/231 |
| 5,201,861 | 4/1993 | Menzel | 62/135 |
| 5,205,129 | 4/1993 | Wright et al. | 62/68 |
| 5,264,234 | 11/1993 | Windhab et al. | 426/519 |
| 5,292,030 | 3/1994 | Kateman et al. | 222/1 |
| 5,345,781 | 9/1994 | Fels et al. | 62/343 |
| 5,385,464 | 1/1995 | Anderson | 425/145 |
| 5,410,888 | 5/1995 | Kaiser et al. | 62/136 |
| 5,419,150 | 5/1995 | Kaiser et al. | 62/342 |
| 5,433,084 | 7/1995 | Kaiser et al. | 62/306 |
| 5,433,967 | 7/1995 | Kateman et al. | 426/565 |
| 5,473,909 | 12/1995 | Kateman et al. | 62/306 |
| 5,713,209 | 2/1998 | Huncher et al. | 62/68 |

APPARATUS FOR MANUFACTURING FROZEN CONFECTION

BACKGROUND OF THE INVENTION

A. Field of the Invention

The invention relates to the manufacture of high-quality frozen foods such as ice cream, yogurt, and the like.

B. Prior Art

Frozen food products are typically produced in batch form, i.e., a quantity substantially larger than the amount commonly required by a single user is produced in advance of a specific request and is held available for subsequent dispensing. For example, in machines for dispensing "soft" ice cream to the individual consumer, although an individual consumer might want a serving of only a few ounces, it is common to dispense this from a machine which makes a quantity measured in quarts or gallons in advance of the request and which stores the excess for subsequent sale. The product necessarily deteriorates during this storage, both through oxidation and through the growth of ice crystals which detract from whatever smoothness the product originally possessed when fresh.

Novel apparatus and methods suitable for producing, on demand, quantities of frozen food product such as ice cream, yogurt or the like that range from in the order of ounces to gallons or unlimited amounts is described in a series of patents of which two of the inventors of the present invention are co-inventors, namely, U.S. Pat. No. 5,292,030, "Method And Apparatus For Producing And Dispensing Aerated Products", issued Mar. 8, 1994; U.S. Pat. No. 5,433,967, "Method And Apparatus For Producing And Dispensing Aerated Or Blended Food Products", and U.S. Pat. No. 5,473,909, "Method And Apparatus For Producing And Dispensing Aerated Or Blended Fluid Products", issued Dec. 12, 1995. The teachings of these patents are expressly incorporated herein by reference.

SUMMARY OF THE INVENTION

A. Objects of the Invention

Accordingly, it is an object of the invention to provide a method and apparatus for forming a frozen confection, food, or the like of high quality and in amounts that extend down to the order of ounces or less.

Further, it is an object of the invention to provide a method and apparatus for producing "on demand" a high quality frozen confection, food or the like.

Another object of the invention is to provide apparatus for producing "on demand" a high quality frozen confection, food or the like which is simply constructed, readily serviceable, and easily maintained in a sanitary condition.

Yet a further object of the invention is to provide a method and apparatus for producing "on demand" a high quality frozen confection, food or the like in which different flavors may readily be imparted to a base mixture during the "on demand" production of the resultant product and with minimum carry-over from one serving to the next.

Another object of the invention is to provide method and apparatus for producing "on demand" flavoring for a frozen food product.

B. Brief Description Of The Preferred Embodiment of The Invention

In accordance with the present invention, an aerated base mixture of unflavored ice cream, yogurt or other food base or mix is fed in liquid form to the interior of an elongated freezing chamber having a rotating screw therein. The chamber wall is cooled to a temperature below freezing by means of cooling fluid applied to the exterior thereof. The liquid base in the screw threads is moved longitudinally along the chamber by the screw and increasingly cools as it contacts the wall of the chamber in traveling down the chamber. The device functions more or less as a positive displacement pump pumping the base along the chamber such that there is microcirculation of the base within the valleys of the screw thread(s). Liquid base is continuously circulated under positive pressure into heat exchange contact with the chamber walls and freezes progressively. This minimizes air cell and ice crystal size and uniformly distributes these elements throughout the food product.

Thus, the operation of the present apparatus contrasts sharply with prior devices with rotating blades which scrape frozen material from the surface of the chamber and remix it into the bulk of unfrozen material within the chamber.

By the time the base reaches the remote end of the chamber, the base is in the form of a highly viscous slurry or paste that is cooled to a temperature at or near its freezing point.

The base product exits the chamber into an end cap that both supports the screw and provides convoy channels that carry the product to a discharge bore from which the product may exit the chamber. Extending into the bore from the exterior is one or more flavoring channels, and a drive shaft for a mixer blade positioned in the bore or the chamber and on the end of the shaft. The blade intermixes the flavoring and the base product before discharge of the product from the bore.

The convoy channels in the end cap are desirably of limited total volume in relation to the volume of a typical ice cream cone serving in order to minimize the amount of product resident in the machine at any time. For similar reasons, as well as to achieve rapid and thorough cooling of the product, the clearance between the screw and the inner wall of the chamber is very small, e.g., on the order of a tenth of an inch or less.

SPECIFIC DESCRIPTION OF THE INVENTION

A. Drawings

The foregoing and other and further objects and features of the invention will be more fully understood from reference to the following detailed description of the invention, when taken in conjunction with the accompanying drawings, in which.

PREFERRED EMBODIMENT

Figure 1:
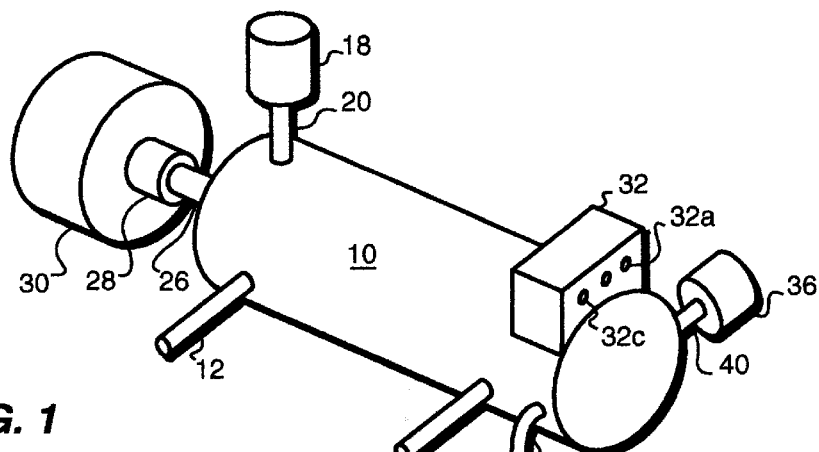
FIG. 1 is a view in perspective of apparatus for producing high-quality frozen confection or food on demand.

In FIG. 1, a longitudinally extended freezing chamber 10 is supplied with cooling fluid through a supply tube 12. The cooling fluid traverses the chamber 10 through channels 14 in the interior thereof (see FIG. 2) and exits through a discharge tube 16. A reservoir 18 of confection or food product mix in the liquid state is supplied to the chamber 10 at an inlet end thereof via feed tube 20. The product preferably comprises an unflavored base mix that has been aerated and is ready for chilling or near freezing. A suitable method and apparatus for forming the base mix is described in U.S. Pat. Nos. 5,292,030, 5,433,967, and 5,473,909, referred to above.

Although we have shown chamber 10 oriented horizontally and the mix being introduced through the side wall of the chamber, the chamber 10 could just as well be vertical and the liquid flowed into the upper end of the chamber from any suitable source of aerated mix, e.g., a turbulence tube as disclosed in the above-identified patents.

The liquid mix is carried through the chamber 10 by means of a screw 22 (see FIG. 2) and is discharged from the chamber at an outlet end thereof via a discharge nozzle 24. The screw 22 is driven by a spindle 26 connected to a shaft 28 of a motor 30. A flavoring head 32 is located at the outlet end of the chamber 10 and imparts different flavorings to the mix inside the chamber through separate nozzles 34a, 34b, 34c (see FIG. 3) before the mix exits the chamber. The specific flavor may be selected by actuating selector buttons 32a, 32b, 32c, respectively. Three such nozzles and buttons, and thus three such flavors, have been shown for purposes of illustration, although more or less may be used. A motor 36 drives a perforate mixer blade 38 (see FIG. 3) via a shaft 40 in order to intermix the flavoring with the base mix before the latter is discharged through the nozzle 24.

Figure 2:
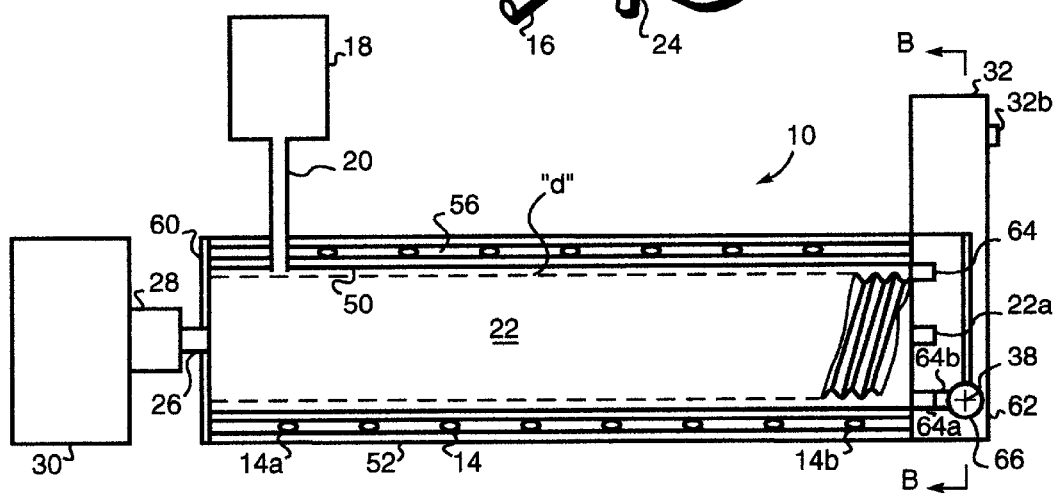
FIG. 2 is a diametric section, with parts shown in elevation, of the apparatus shown in FIG. 1.
Figure 3:
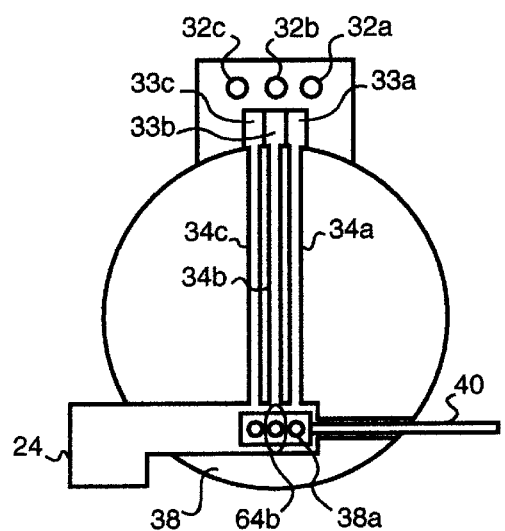
FIG. 3 is a cross-section along the line B—B of FIG. 2.

Turning now to FIGS. 2 and 3, the interior of the chamber 10 is shown in more detail. For purposes of illustration, the chamber is shown as comprising an elongated double-walled cylinder having an inner wall 50 and a concentric outer wall 52 enclosing between them a spirally-wound cooling coil 14 in contact with, and encompassing, the inner wall 50. The coil 14 is connected at an inlet end 14a to coolant inlet tube 12 and at an outlet end 14b to coolant discharge tube 16. A removably attached end plate 60 adjacent the fluid mix inlet 20 seals the interior of the chamber at one end thereof, and a removably-attached end plate 62 adjacent the chilled mix outlet tube 16 seals the chamber at the other end thereof. The screw 22 is supported at one end by the shaft 26 which extends through the end plate 60, and is supported at the other end by a shaft extension 22a which rotates in a mating recess in plate 62.

The screw 22 is spaced a slight distance "d" from the interior wall 50. Plate 62 has a circumferential groove 64 formed on its interior face of radial dimension "d" matching the spacing between the screw and the interior wall and of relatively slight depth. A bore 64b extends longitudinally (as seen in FIG. 2) from a lower portion of the groove 64a into a transverse bore 66. The bore 66 communicates with nozzle 24.

Liquid supplied to the chamber 10 from reservoir 18 is confined between the exterior surfaces of the threads of the screw 22 and the interior surface of wall 50, which is chilled by the coolant fed through the conduit 56. As the screw is rotated by the motor 30, the mix is advanced longitudinally (i.e., left to right in FIG. 2) within the screw thread and along the cylinder wall. As this occurs, the mix is increasingly chilled and has the form of a highly viscous slurry or paste by the time it reaches the discharge end of the chamber at the end plate 62. On reaching the end plate, it is forced into the circumferential groove 64 and thence through the port 64b into bore 66.

As it traverses the chamber, the mix is confined to a limited volume defined by the volume between the outermost (peak) diameter of the screw and the interior wall of the chamber, as well as the volume contributed by the thread itself (i.e., the volume in the valleys between the peaks and roots of the screws). The former volume is limited by limiting the clearance between the screw and the interior wall of the chamber. The latter can be limited by controlling the thread depth and pitch. The overall volume is desirably limited so as to promote microcirculation of the mix around the longitudinal axes of the thread valleys. Mix is thus circulated into contact with the chilled wall 50 as the mix is, pumped along the chamber by the screw. This results in the formation of ice crystals and air cells in the mix which are quite small, i.e., tens of microns, and a uniform distribution of these cells and crystals throughout the product thereby optimizing product overrun.

As seen more clearly in FIG. 3, flavoring head 32 contains flavoring reservoirs 33a, 33b, 33c which are connected to the bore 66 via tubes 34a–34c. When a particular flavor selector 32a–32c button is operated, it causes head 32 to dispense a corresponding flavor into bore 60. This flavoring is intermixed by rotary mixer 38 with the base mix being supplied to bore 66 through bore 64b before the mix is discharged through discharge nozzle 24. Mixer 38 is advantageously a cruciform paddle wheel having apertures 38a in its blades through which the mix may flow for thorough intermingling with the flavoring.

As an example of a particular configuration for a system in accordance with the present invention, a multiple thread-start screw having a length of 5–20 inches, a pitch of 1–5 inches, a thread depth (peak to root) on the order of 0.1 inch, a clearance (distance between outer screw diameter and inner wall) of about 0.010 inch and rotated at between 100 and 400 rpm can be constructed to chill the base mix to a suitable serving temperature at the time of discharge. Acceptable serving rates on the order of four ounces in ten seconds should readily be achievable. This system provides a thin mix layer which dynamically cools the mix as it is forced along the chamber by the screw and is also believed to microcirculate or "work" the mix as it is advanced to thereby avoid large ice-crystal formation. It also avoids scraping the interior wall where such crystals would most readily form.

It will be understood that the foregoing description is illustrative only, and the invention is not limited to the specific parameters and details shown and described. For example, longer or shorter screws may be used, of different pitch, diameter and number of "starts", and rotated at different speeds. The screw material is preferably plastic, such as Delrin (a trademark of DuPont), but may be any of a variety of other plastic or non-plastic materials. More than one screw may be used, e.g., two or more screws in co- or counter-rotating interlocking fashion to more positively advance the material through the chamber. Also, the starting mix could itself be flavored and to which other flavors may be added during the process.

The volume of the conduits at the discharge end, such as groove 64a and bore 64b should be kept as small as practicably possible in order to minimize the amount of chilled mix resident in the system after a serving. A variety of base mixtures may be used, and these may be fed from the side (as illustrated herein) or from the end, under gravity feed or under pressure, etc. The mix is preferably a dairy mix, but other food mixes may be used.

CONCLUSION

From the foregoing it will be seen that there is described a method and apparatus for manufacturing frozen confection or other foods that is particularly adapted to providing fresh single-serving portions on demand. The system avoids batch processing, is simple, and is expected to be readily maintainable in sanitary condition without excessive labor.

We claim:

1. Apparatus for manufacturing a chilled or frozen food product, said apparatus comprising:

A. a chamber for cooling a food mix applied thereto,
B. at least one screw having threads and being rotatably mounted within said chamber,
C. means for cooling an interior wall of said chamber,
D. means for supplying a food mix to said chamber at one end thereof, said mix being confined to a volume defined by the chamber wall and the screw threads and being advanced along said chamber by said screw threads as said screw rotates and being chilled through said interior chamber wall, said screw threads being spaced from the chamber interior wall by a selected small distance said rotating screw promoting microcirculation of the mix between adjacent screw threads thereby inhibiting mixing of the chilled mix with less chilled mix within the chamber.

2. Apparatus in accordance with claim 1 which includes means for flavoring said mix as it exits an end of said chamber remote from said inlet end.

3. Apparatus in accordance with claim 2 in which said mix is applied to said chamber in liquid form.

* * * * *